US010243872B2

(12) United States Patent
Agarwala et al.

(10) Patent No.: US 10,243,872 B2
(45) Date of Patent: *Mar. 26, 2019

(54) MANAGEMENT OF STORAGE CLUSTER PERFORMANCE WITH HYBRID WORKLOADS

(71) Applicant: International Business Machines Corporation, Armonk, NY (US)

(72) Inventors: Sandip Agarwala, San Jose, CA (US); Dean Hildebrand, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/896,666

(22) Filed: Feb. 14, 2018

(65) Prior Publication Data
US 2018/0176146 A1 Jun. 21, 2018

Related U.S. Application Data

(63) Continuation of application No. 15/438,839, filed on Feb. 22, 2017, now Pat. No. 9,979,671, which is a
(Continued)

(51) Int. Cl.
*G06F 9/50* (2006.01)
*H04L 12/24* (2006.01)
(Continued)

(52) U.S. Cl.
CPC ............. *H04L 47/76* (2013.01); *G06F 9/50* (2013.01); *G06F 9/505* (2013.01); *G06F 9/5094* (2013.01);
(Continued)

(58) Field of Classification Search
CPC . H04L 67/10; H04L 67/1095; H04L 67/1097; H04L 67/1002; H04L 47/78;
(Continued)

(56) References Cited

U.S. PATENT DOCUMENTS 6,715,100 B1 3/2004 Hwang
6,732,171 B2 5/2004 Hayden
(Continued)

OTHER PUBLICATIONS

Jang et al., A Content-Based Load Balancing Algorithm for Metadata Servers in Cluster File Systems, Parallel and Distributed Processing and Applications, Third International Symposium, ISPA 2005. Proceedings, Nov. 2-5, 2005, Ninjing, China, pp. 49-57.
(Continued)

*Primary Examiner* — Patrice L Winder
*Assistant Examiner* — Angela M Widhalm De Rodrig
(74) *Attorney, Agent, or Firm* — Lieberman & Brandsdorfer, LLC

(57) ABSTRACT

Embodiments relate to management of hybrid workloads in a shared pool of configurable computer resources. Resource utilization in the shared pool is dynamically tracked, and employed for assessing a set of servers a parallel access protocol should utilize for one or more I/O requests in conjunction with any serial workload optimizations. Accordingly, the load balancing embodies a diverse set of workloads to support dynamic and equitable allocation.

20 Claims, 9 Drawing Sheets

Related U.S. Application Data continuation of application No. 13/222,892, filed on Aug. 31, 2011, now Pat. No. 9,658,892.

(51) Int. Cl.
*H04L 29/06* (2006.01)
*H04L 29/08* (2006.01)
*H04L 12/801* (2013.01)
*H04L 12/851* (2013.01)
*H04L 12/911* (2013.01)
*H04L 12/917* (2013.01)

(52) U.S. Cl.
CPC .......... *H04L 41/0896* (2013.01); *H04L 47/10* (2013.01); *H04L 47/24* (2013.01); *H04L 47/78* (2013.01); *H04L 67/10* (2013.01); *H04L 67/1002* (2013.01); *H04L 67/1095* (2013.01); *H04L 67/1097* (2013.01); *H04L 67/148* (2013.01); *H04L 67/42* (2013.01)

(58) Field of Classification Search
CPC . H04L 47/10; G06F 9/505; G06F 9/50; G06F 9/5094
See application file for complete search history.

(56) References Cited

U.S. PATENT DOCUMENTS

| | | |
|---|---|---|
| 6,886,035 B2 | 4/2005 | Wolff |
| 6,990,666 B2 | 1/2006 | Hirshfeld et al. |
| 7,096,222 B2 | 8/2006 | Kern et al. |
| 7,209,967 B2 | 4/2007 | Kitamura |
| 7,243,089 B2 | 7/2007 | Becker-Szendy et al. |
| 7,246,207 B2 | 7/2007 | kottomtharayil et al. |
| 7,308,512 B1 | 12/2007 | Son |
| 7,339,896 B2 | 3/2008 | Ain et al. |
| 7,529,784 B2 | 5/2009 | Kavuri et al. |
| 7,631,128 B1 | 12/2009 | Sgrosso et al. |
| 7,676,561 B1 | 3/2010 | Rai et al. |
| 7,676,581 B2 | 3/2010 | Isaacs |
| 7,680,905 B1 | 3/2010 | Roberts et al. |
| 8,015,215 B2 | 9/2011 | Coverston et al. |
| 8,122,427 B2 | 2/2012 | Chrysanthakoppulos et al. |
| 8,145,806 B2 | 3/2012 | Lee et al. |
| 8,145,516 B2 | 5/2012 | Blanchard, III et al. |
| 8,219,794 B1 | 7/2012 | Wang et al. |
| 8,375,144 B2 | 2/2013 | Bunch et al. |
| 8,589,938 B2 | 11/2013 | Craik et al. |
| 8,665,835 B2 | 3/2014 | Hussein et al. |
| 8,880,682 B2 | 11/2014 | Bishop et al. |
| 8,930,537 B2 | 1/2015 | Basham et al. |
| 8,965,860 B2 | 2/2015 | Cheenath et al. |
| 9,088,577 B2 | 7/2015 | Zhu et al. |
| 9,177,157 B2 | 11/2015 | Binder |
| 9,213,721 B1 | 12/2015 | Faibish et al. |
| 2006/0047899 A1 | 3/2006 | Ilda et al. |
| 2006/0064405 A1 | 3/2006 | Jiang et al. |
| 2007/0088702 A1 | 4/2007 | Fridella et al. |
| 2011/0125889 A1 | 5/2011 | Tsao |
| 2011/0289206 A1 | 11/2011 | Vecera et al. |
| 2012/0057456 A1 | 3/2012 | Bogatin et al. |
| 2012/0110584 A1 | 5/2012 | Chaudhry et al. |
| 2012/0324073 A1 | 12/2012 | Dow et al. |

OTHER PUBLICATIONS

Hildebrand et al., Exporting Storage Systems in a Scalable Manner with pNFS, CITI Technical Report, Center for Information Technology Integration, University of Michigan, Feb. 1, 2005, pp. 1-11.

| $C(AR_i,r)$ | $\text{Min}[\,C(AR_i,r)\,]$ | $\text{Min}[\,C(AR_i,r)\,]*r$ |
|---|---|---|
| 1 | 4 | 4 |
| 2 | 3 | 3 |
| 3 | 1 | 1 |
| 4 | 8 | 8 |
| 1,2 | 3 | 6 |
| 1,3 | 1 | 2 |
| 1,4 | 4 | 8 |
| 2,3 | 1 | 2 |
| 2,4 | 3 | 6 |
| 3,4 | 1 | 2 |
| 1,2,3 | 1 | 3 |
| 1,2,4 | 3 | 9 |
| 1,3,4 | 1 | 3 |
| 2,3,4 | 1 | 3 |
| 1,2,3,4 | 1 | 4 |

So final answer is storage servers 1, 2, 4

MANAGEMENT OF STORAGE CLUSTER PERFORMANCE WITH HYBRID WORKLOADS

CROSS-REFERENCE TO RELATED APPLICATION(S)

This application is a continuation patent application claiming the benefit of the filing date of U.S. patent application Ser. No. 15/438,839, filed on Feb. 22, 2017 and titled "Management of Storage Cluster Performance With Hybrid Workloads", now pending, and U.S. patent application Ser. No. 13/222,892, filed on Aug. 31, 2011 and titled "Management of Storage Cluster Performance with Hybrid Workloads", now pending, which are hereby incorporated by reference.

BACKGROUND

The embodiments relate to management of performance of concurrent parallel and serial file access protocols to a storage system. More specifically, the embodiments relate to tracking storage usage and directing parallel access client to available storage to ensure that available storage server bandwidth is fully utilized.

Cloud computing is a model of service delivery for enabling convenient, on-demand network access to a shared pool of configurable computer resources, e.g. networks, network bandwidth, servers, processing, memory, storage, applications, virtual machines, and services, that can be rapidly provisioned and released with minimal management effort or interaction with a provider of service. One of the characteristics of cloud computing infrastructure is that applications can be launched from a plurality of locations. Several factors drive the decision to launch an application in a specific data center, including resource availability, user location, disaster awareness, data location, and available facilities.

One of the current developments in cloud computing pertains to storage capacity and performance. More specifically, there is a shift to a parallel file system architecture from a single client-server distributed file system architecture. The parallel file system architecture provides increased bandwidth through multiple parallel I/O streams. When the parallel file system architecture and a client-server architecture are used to access a single storage system, allocation of resources is either performed manually or using back of the envelope calculations.

BRIEF SUMMARY

The embodiments comprise a system, computer program product, and method for storage cluster performance for hybrid workloads.

In one aspect, the system is provided with a processing unit in communication with a memory, and a server. The server has a tool to manage a heterogeneous I/O workload across one or more storage servers. The heterogeneous I/O workload comprises both a parallel and a serial I/O workload. The tool tracks resource utilization across the one or more storage servers. The tool balances a received I/O request across the one or more storage servers. More specifically a layout of the one or more storage servers to service a received I/O request is determined based on the tracked resource utilization. The layout determination includes determining a quantity of serial I/O workloads to be processed by each of the one or more storage servers and a set of the one or more storage servers to support at least one parallel I/O workload. The tool issues a migration request responsive to the determined layout. The migration request includes at least one serial I/O workload currently supported by one of the storage servers and at least one different server to support the at least one serial I/O workload. The received I/O request is serviced by the tool with the determined layout.

In another aspect, the computer program product is provided for management of a heterogeneous I/O workload. The computer program product includes a computer readable storage medium with embodied program code that is configured to be executed by a processor. More specifically, program code tracks resource utilization across the one or more storage servers. Program code balances a received I/O request across the one or more storage servers. More specifically a layout of the one or more storage servers to service the received I/O request is determined based on the tracked resource utilization. The layout determination includes determining a quantity of serial I/O workloads to be processed by each of the one or more storage servers and a set of the one or more storage servers to support at least one parallel I/O workload. Program code issues a migration request responsive to the determined layout. The migration request includes at least one serial I/O workload currently supported by one of the storage servers and at least one different server to support the at least one serial I/O workload. Program code services the received I/O request with the determined layout.

In yet another aspect, the method is provided for management of a heterogeneous I/O workload. More specifically, resource utilization is tracked across the one or more storage servers. A received I/O request is balanced across the one or more storage servers. More specifically, a layout of the one or more storage servers to service the received I/O request is determined based on the tracked resource utilization. The layout determination includes determining a quantity of serial I/O workloads to be processed by each of the one or more storage servers and a set of the one or more storage servers to support at least one parallel I/O workload. A migration request is issued responsive to the determined layout. The migration request includes at least one serial I/O workload currently supported by one of the storage servers and at least one different server to support the at least one serial I/O workload. The received I/O request is serviced with the determined layout.

Other features and advantages of the embodiments will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some and not of all of the embodiments unless otherwise explicitly indicated.

FIG. 4 depicts a diagram showing a parallel layout determination using mathematical and logical operations.

DETAILED DESCRIPTION

Figure 1:
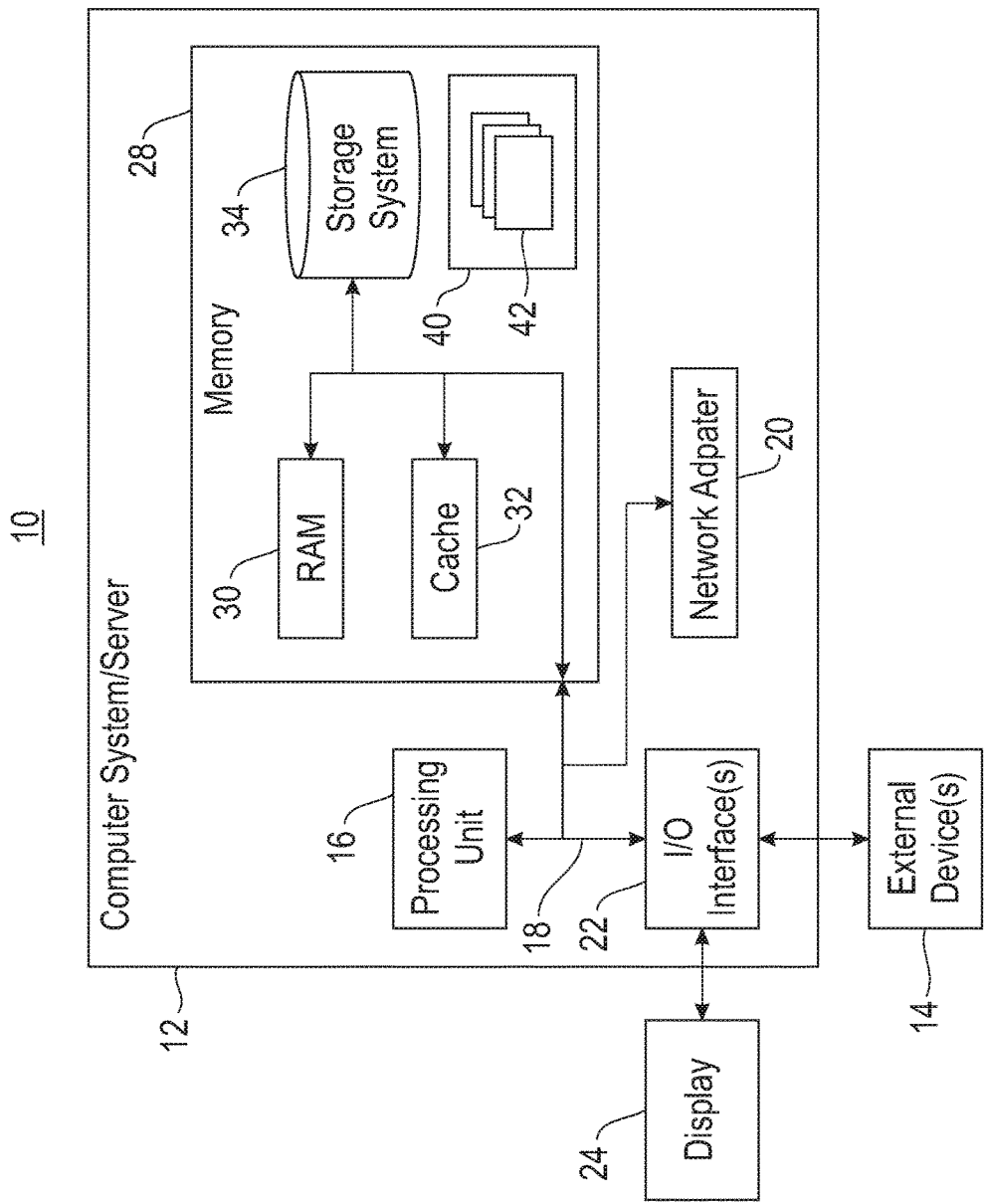
FIG. 1 depicts a cloud computing node according to an embodiment.

It will be readily understood that the components of the present embodiment(s), as generally described and illustrated in the Figures herein, may be arranged and designed in a wide variety of different configurations. Thus, the following detailed description of the embodiments of the apparatus, system, and method of the present embodiment(s), as presented in the Figures, is not intended to limit the scope of the embodiment(s), as claimed, but is merely representative of selected embodiments.

The functional unit described in this specification has been labeled with both managers and a director. The functional unit may be implemented in programmable hardware devices such as field programmable gate arrays, programmable array logic, programmable logic devices, or the like. The functional unit may also be implemented in software for processing by various types of processors. An identified manager or director of executable code may, for instance, comprise one or more physical or logical blocks of computer instructions which may, for instance, be organized as an object, procedure, function, or other construct. Nevertheless, the executables of the functional unit need not be physically located together, but may comprise disparate instructions stored in different locations which, when joined logically together, comprise the managers and director and achieve the stated purpose of the managers and director.

Indeed, a manager or director of executable code could be a single instruction, or many instructions, and may even be distributed over several different code segments, among different applications, and across several memory devices. Similarly, operational data may be identified and illustrated herein within the manager and/or director, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of an application manager, a replication manager, a migration manager, etc., to provide a thorough understanding of embodiments. One skilled in the relevant art will recognize, however, that the embodiment(s) can be practiced without one or more of the specific details, or with other methods, components, materials, etc. In other instances, well-known structures, materials, or operations are not shown or described in detail to avoid obscuring aspects of the embodiment(s).

The illustrated embodiments will be best understood by reference to the drawings, wherein like parts are designated by like numerals throughout. The following description is intended only by way of example, and simply illustrates certain selected embodiments of devices, systems, and processes that are consistent with the embodiment(s) as claimed herein.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (10) is only one example of a suitable cloud computing node and is not intended to suggest any limitation as to the scope of use or functionality of embodiments described herein. Regardless, cloud computing node (10) is capable of being implemented and/or performing any of the functionality set forth hereinabove. In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16). Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments.

Program/utility (40), having a set (at least one) of program modules (42), may be stored in memory (28) by way of example, and not limitation, as well as an operating system, one or more application programs, other program modules, and program data. Each of the operating systems, one or more application programs, other program modules, and program data or some combination thereof, may include an implementation of a networking environment. Program modules (42) generally carry out the functions and/or methodologies of embodiments as described herein.

Computer system/server (12) may also communicate with one or more external devices (14), such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
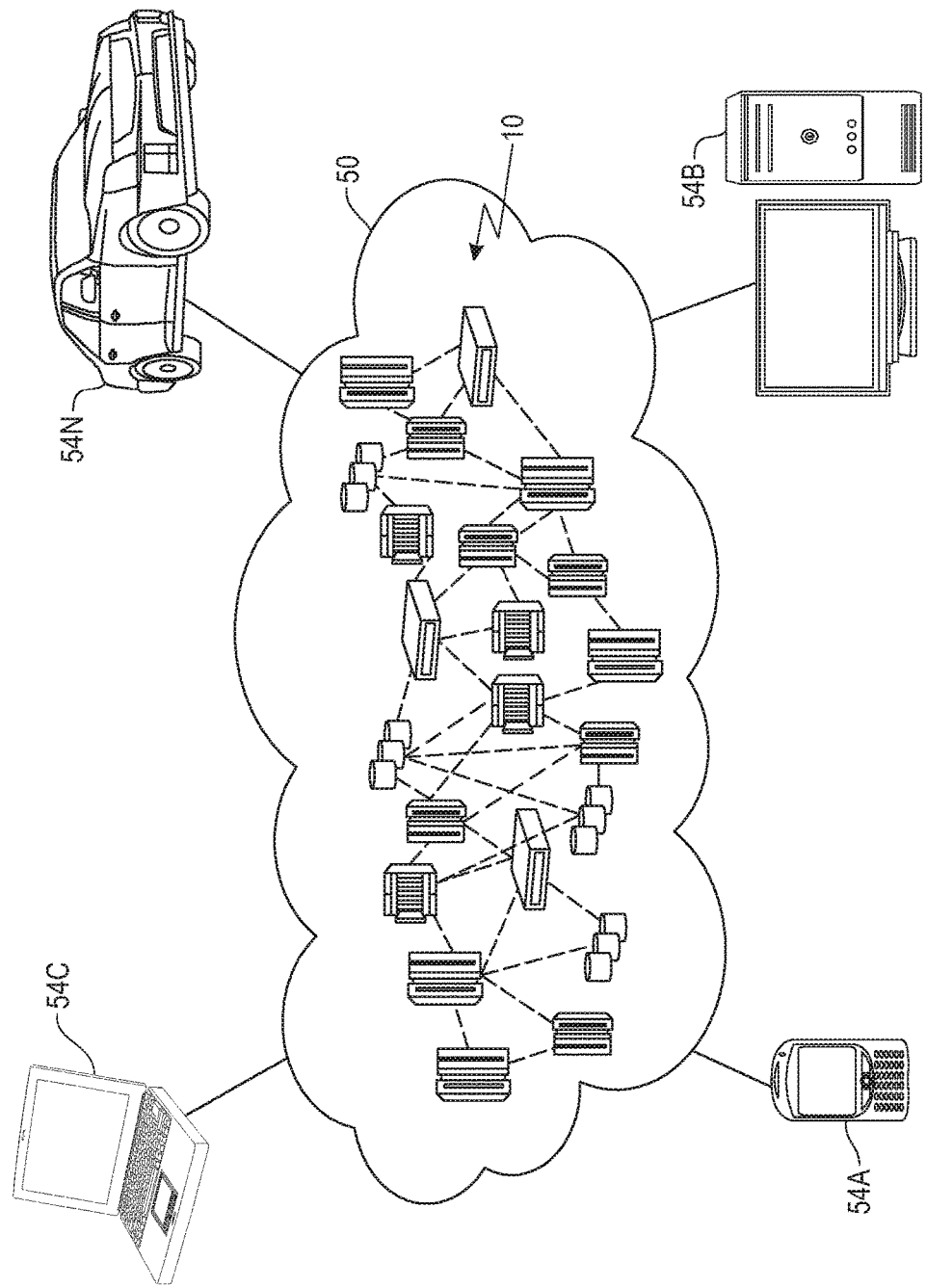
FIG. 2 depicts a cloud computing environment according to an embodiment.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A)-(54N) shown in FIG. 2 are intended to be illustrative only and that computing nodes (10) and cloud computing environment (50) can communicate with any type of computerized device over any type of network and/or network addressable connection (e.g., using a web browser).

Figure 3:
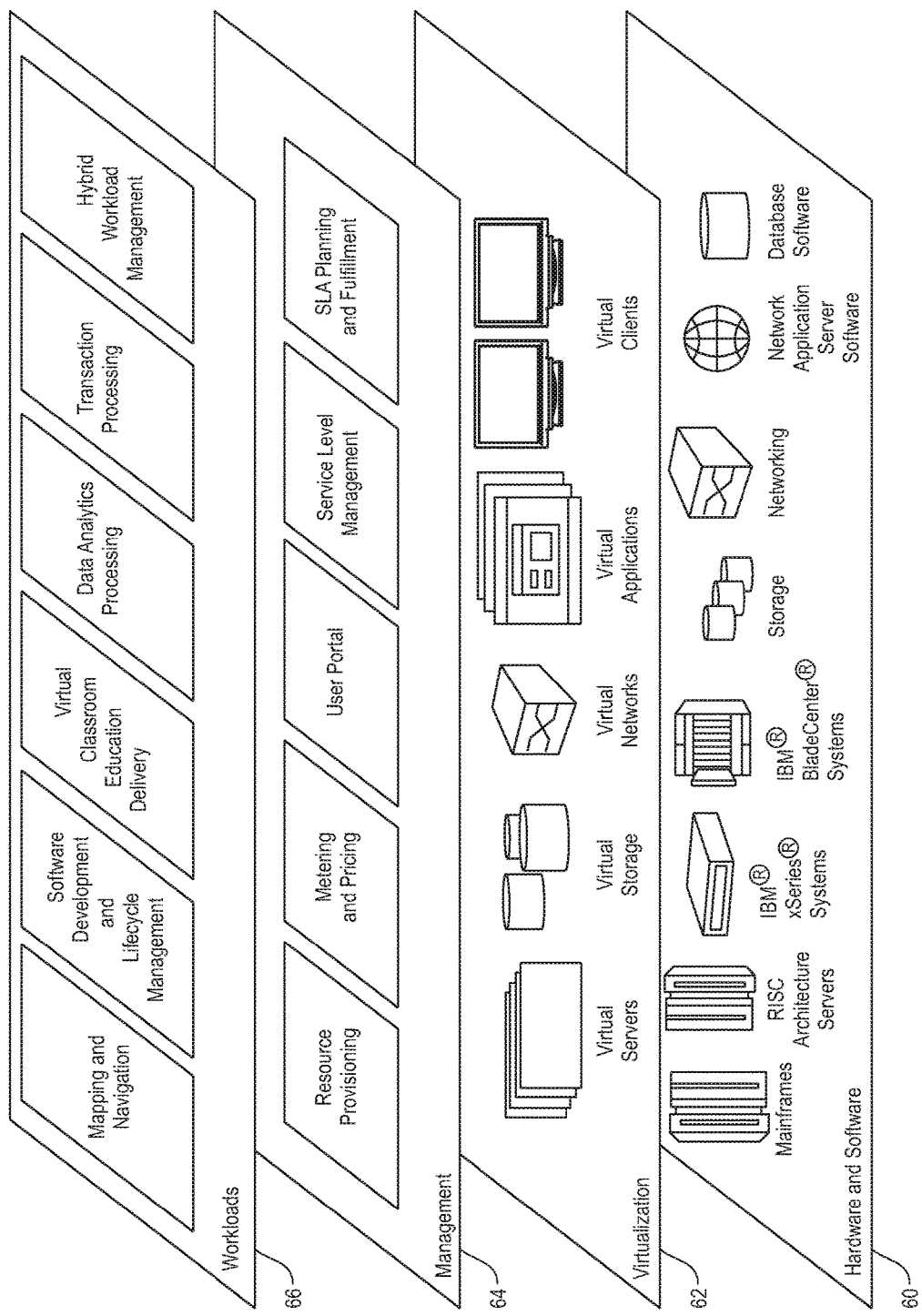
FIG. 3 depicts abstraction model layers according to an embodiment.

Referring now to FIG. 3, a set of functional abstraction layers provided by cloud computing environment (50) (FIG. 2) is shown. It should be understood in advance that the components, layers, and functions shown in FIG. 3 are intended to be illustrative only and embodiments are not limited thereto. As depicted, the following layers and corresponding functions are provided: hardware and software layer (60), virtualization layer (62), management layer (64), and workload layer (66). The hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer includes, but is not limited to: mapping and navigation; software development and lifecycle management; virtual classroom education delivery; data analytics processing; operation processing; and management and performance associated with hybrid workloads within the cloud computing environment.

In the shared pool of configurable computer resources described herein, hereinafter referred to as a cloud computing environment, the level of performance and/or quality of service attained by any workload is in part dependent on the amount of resources allocated to support the workload. In a homogeneous architecture parallel requests are naturally balanced across all servers. However, in a heterogeneous architecture parallel performance is limited to the slowest server. A method and system are provided to intelligently allocate system resources to support balanced workloads in the heterogeneous architecture. More specifically, the quantity of data servers is systematically determined based on the workload characteristics and requirements, as well as the underlying resource capacity and availability. Accordingly, a balanced workload combines serial and parallel I/O mapping to maximize available resources.

One aspect of calculating a balanced workload includes a determination of sources. In one embodiment, this aspect of calculating employs a simple and smart optimization algorithm that quickly and efficiently computes a balanced workload placement, and as such may be desirable for use during run time for arriving new workloads. The variable $Ar_i$ is a metric employed to represent available resources, such as bandwidth, for storage server i. In addition, a metric $C(Ar_i, r)$ is employed to represent all possible sets of storage servers, n, and their available resources. The variable r represents the quantity of storage servers. Logical operators are employed with the metrics to determine an appropriate set of storage servers to support the I/O request. More specifically, $Min[C(Ar_i, r)]$ returns the limiting storage server of the group, e.g. the storage server with the minimum performance. Logical operators are also employed with the metrics to determine an expected performance. More specifically, $Min[C(Ar_i, r)]*r$ returns the expected bandwidth performance to be attained for a combination group of storage servers. The goal is to calculate the set of servers for a layout that will give the best performance with respect to the tracked resources. The formula $Min[C(Ar_i, r)]*r$ returns the expected bandwidth because when parallelizing I/O across a set of storage nodes, where each node handles 1/r of the data, the overall performance will be that of the slowest storage server. The set of storage servers to support the I/O transaction is defined as $Max [Min [C (Ar_i, r)]*r]$, which represents the maximum performance achievable by the given set of servers. As shown herein, the computationally elements are relatively non-complex. In one embodiment and based on the relatively non-complex computations, this aspect of computation may be employed during run time for new workloads. Accordingly, a combination of mathematical and logical operators and associated operations are performed FIG. 4 is a block diagram (400) showing a parallel layout determination with the mathematical and logical operations illustrated above. In the example shown herein there are four servers, and the metric to quantify the available resources, $Ar_i$ is shown as {4, 3, 1, 8}, for servers 1 through 4. In this example, the greater the value, the more resources a server has available. Three columns are shown in the chart. The first column (410) represents the metric employed to represent all possible sets of storage servers n and their available resources $C(Ar_i, r)$. The second column (420) represents the limiting storage server of the group, $Min[C(Ar_i, r)]$. The third column (430) represents the expected bandwidth performance to be attained $Min[C(Ar_i, r)]*r$. The goal is to determine the sets of storage servers to support the I/O transaction which is represented as the greatest value in the third column (430). In the example shown herein, the combination of servers at (440) yields the maximum value with equal proportions across the designated servers. More specifically, a maximum amount of resources are available at (440) with an equal distribution across the resources.

A second aspect employs a complex level of evaluation and is described below. As workloads are added, the storage servers may become imbalanced and/or the resources may be unfairly allocated to the workloads. This addition of workloads requires a global optimization algorithm to balance the parallel and serial workloads across the set of storage servers as well as ensure fair allocation of the resources. It is understood that parallel protocols will focus on streaming bandwidth and serial protocols will focus on I/O per second. As referenced in FIG. 4, a load balance is distributed across the selected storage servers to service the workload. The following description is a second aspect that optimizes both serial and parallel workloads across the entire system as well as accounts for service level objectives. The variable $L_{i,j}$ represents a load matrix on storage server i due to workload j. The variable $P_{i,j}$ represents a placement matrix. A non-zero $P_{i,j}$ denotes that workload j uses storage server i. For non-parallel workloads, i.e. serial workloads, only one of the members in the placement matrix has a non-zero value as they connect to only one storage server. This storage server may connect to more than one storage node in the back-end. For a parallel workload, multiple members in the placement matrix may have a non-zero value. The variable $L_i$ represents the load due to workload i on a single storage server. For a non-parallel workload, $L_i$ represents the total load of that workload. However, for a parallel workload, $L_i$ represents the total load divided by the total number of storage servers used by the workload.

The matrix C represents the capacity of storage servers. $C_i$ represents the capacity of storage server i. The product of the load matrix and the placement matrix gives the following inequality:

$$\begin{bmatrix} l_o \\ \vdots \\ l_n \end{bmatrix} \begin{bmatrix} p_{0,0} & \cdots & p_{0,n} \\ \vdots & \ddots & \vdots \\ p_{m,0} & \cdots & p_{m,n} \end{bmatrix} \leq \begin{bmatrix} C_o \\ \vdots \\ C_n \end{bmatrix}$$

If workloads are already deployed in the cluster of storage server nodes, the algorithm accounts for the predicted load of the existing workload. More specifically, the current workload is represented by the array U, which represents the predicted load on storage server i based on one or more existing workloads, and it is added to the following inequality:

$$\begin{bmatrix} l_o \\ \vdots \\ l_n \end{bmatrix} \begin{bmatrix} p_{0,0} & \cdots & p_{0,n} \\ \vdots & \ddots & \vdots \\ p_{m,0} & \cdots & p_{m,n} \end{bmatrix} + \begin{bmatrix} u_o \\ \vdots \\ u_n \end{bmatrix} \leq \begin{bmatrix} C_o \\ \vdots \\ C_n \end{bmatrix}$$

In one embodiment, the above formulation assumes that the number of storage servers that a parallel workload connects to is known. The goal of the inequalities is to ensure that the workload is balanced across the storage servers. In one embodiment, attaining this goal is represented in the following formula:

$$\text{Minimize} \sum_i^n (C_i^r - \overline{C^r})^2$$

The calculation described herein in the second aspect takes service level objects into account for each individual workload. In one embodiment, the calculation could be used during runtime to generate new layouts. However, as the calculations are computationally complex, in one embodiment it may be more efficient to be run periodically to perform an overall optimization on the entire system. Accordingly, based on the formula above variance of residual capacities is minimized, which essentially achieves the load balancing across multiple storage servers.

Figure 5:
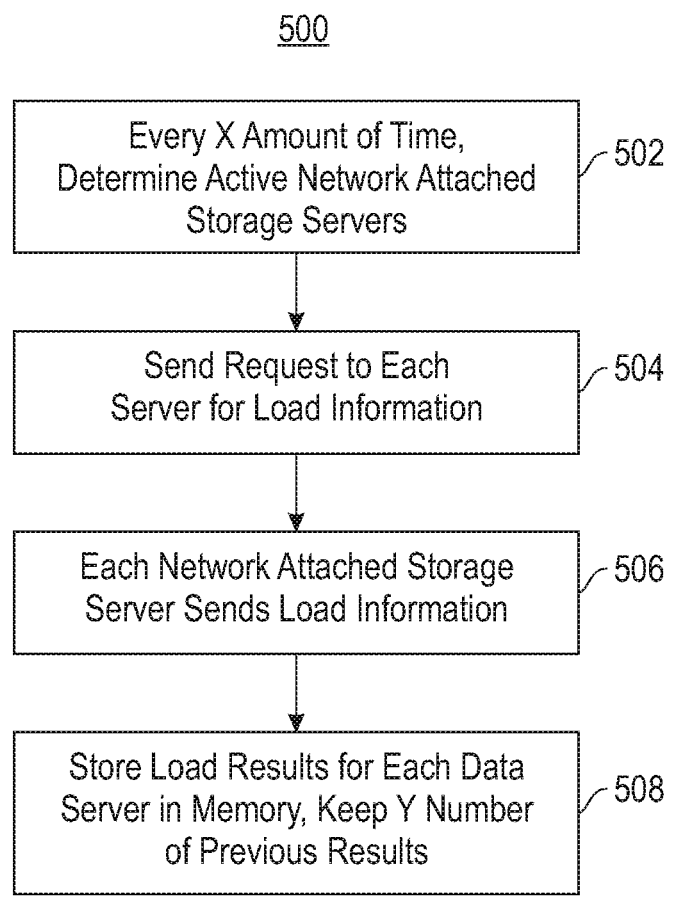
FIG. 5 depicts a flow chart illustrating a process for tracking resource utilization across storage servers.

As demonstrated in the flow charts of FIG. 4, together with the mathematical and logical operations detailed above, a method is employed to support an equitable workload distribution across multiple servers for a heterogeneous workload. FIG. 5 is a flow chart (500) illustrating a process for tracking resource utilization across storage servers. As shown, an interval is establish for determine an active status of each of the storage servers (502). In one embodiment, the interval is a configurable element. At the time the interval is reached, a request is sent to each storage server to ascertain load information (504). More specifically, the load information is solicited from each individual storage server, and each storage server response to the request with individual load information (506). In one embodiment, the load information may include, but is not limited characteristics associated with the CPU, network, storage network, number of mounted client, etc. The received load information for each storage server is stored in memory (508). In one embodiment, a defined quantity of prior load results are retained in memory and periodically older load results are removed from memory. Accordingly, load data for the individual storage servers is requested and retained.

Figure 6:
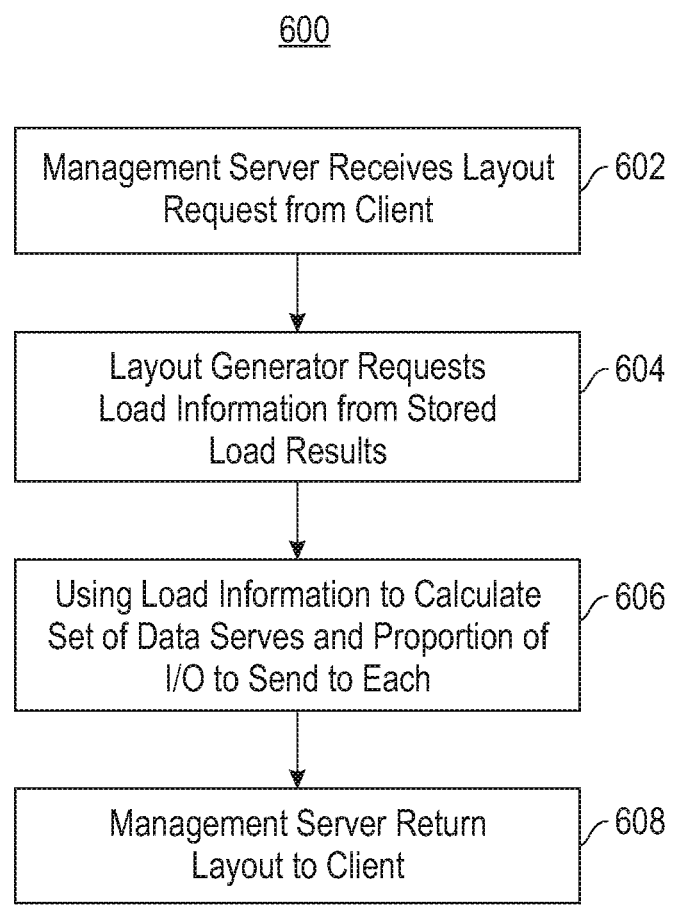
FIG. 6 depicts a flow chart illustrating a process for calculating a layout of servers to support a parallel access request.

Based upon the ascertained load, as shown in FIG. 5, a layout of servers to process the I/O request is generated, as shown below in FIG. 6. More specifically, FIG. 6 is a flow chart (600) illustrating a process for calculating a layout of servers to support a parallel access request. As shown, the server receives a layout request from a client workstation (602). In response to the request, load information is ascertained from the stored load results for each server (604). The stored results together with at least one of the optimization algorithms described in either the first or second aspect are employed to calculate a set of data servers to which I/O request can be proportioned in parallel (606). More specifically, the combination of data at step (606) facilitates determining how to apportion the I/O request, e.g. layout, so as to proportionally distribute the associated load. The layout is then returned to the requesting client workstation (608). Accordingly, the layout generated herein pertains to distributing parallel workloads across one or more data servers in a proportional manner.

Figure 7:
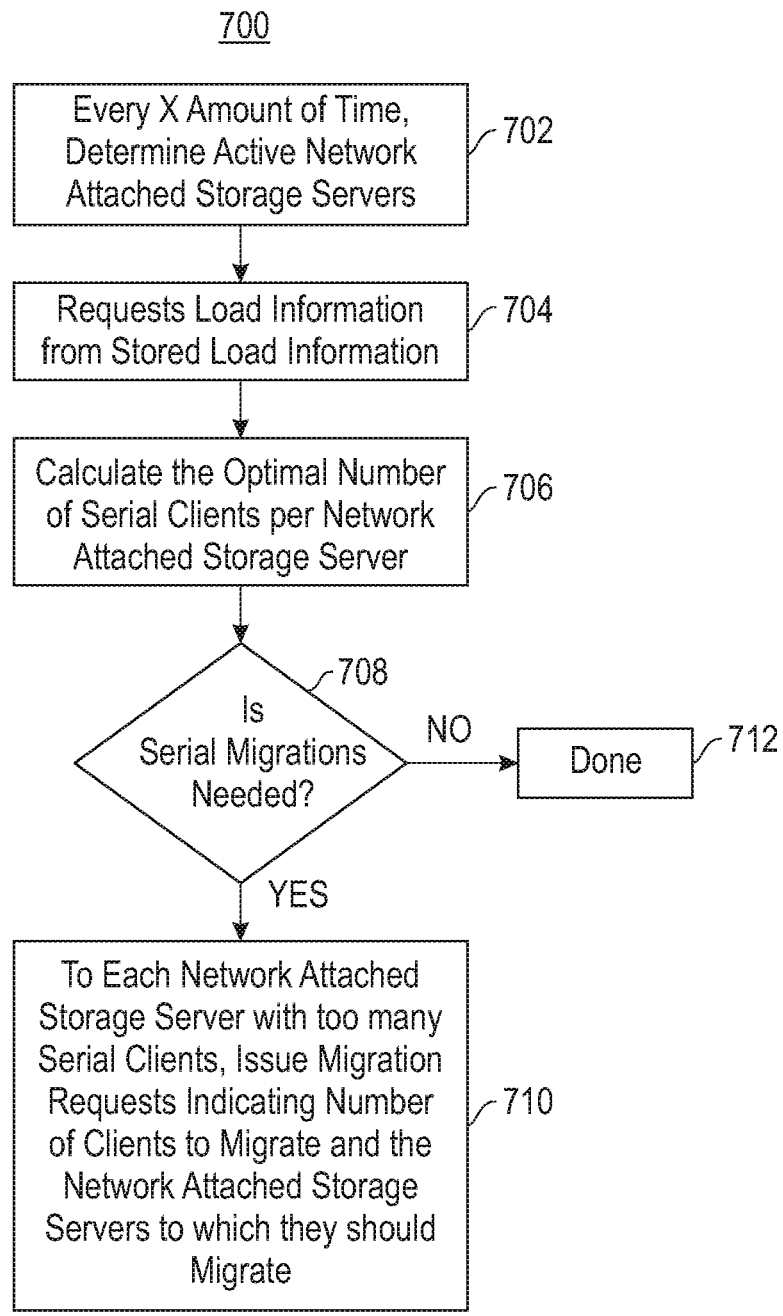
FIG. 7 depicts a flow chart illustrating a process for balancing serial protocols with parallel protocols.

As indicated above, the workload to be serviced may include a hybrid workload entailing both a parallel workload aspect and a serial workload aspect. The parallel aspect pertains to issues of bandwidth and the serial aspect pertains to issues of I/O per second. FIG. 7 is a flow chart (700) illustrating a process for balancing serial protocols with parallel protocols. As shown, an interval is established to determine an active status of each of the storage servers (702). In one embodiment, the interval is a configurable element. Additionally, load information is ascertained from the stored load information for each server (704). The stored results together with at least one of the optimization algorithms described in the first and second aspects are employed to calculate an optimal number of serial clients per network attached storage (706). It is then determined if a serial migration is required (708). A positive response to the determination at step (708) is followed by issuing a migration requests indicating the number of clients to migrate and the network attached storage to which they should migrate (710). Conversely, a negative response to the determination at step (708) concludes the process of balancing serial protocols (712). In one embodiment, the exact migration steps depend on the type of serial migration, as each protocol has different mechanisms for migration. Accordingly, serial connections are managed and migrated among the network attached storage as deemed necessary.

Figure 8:
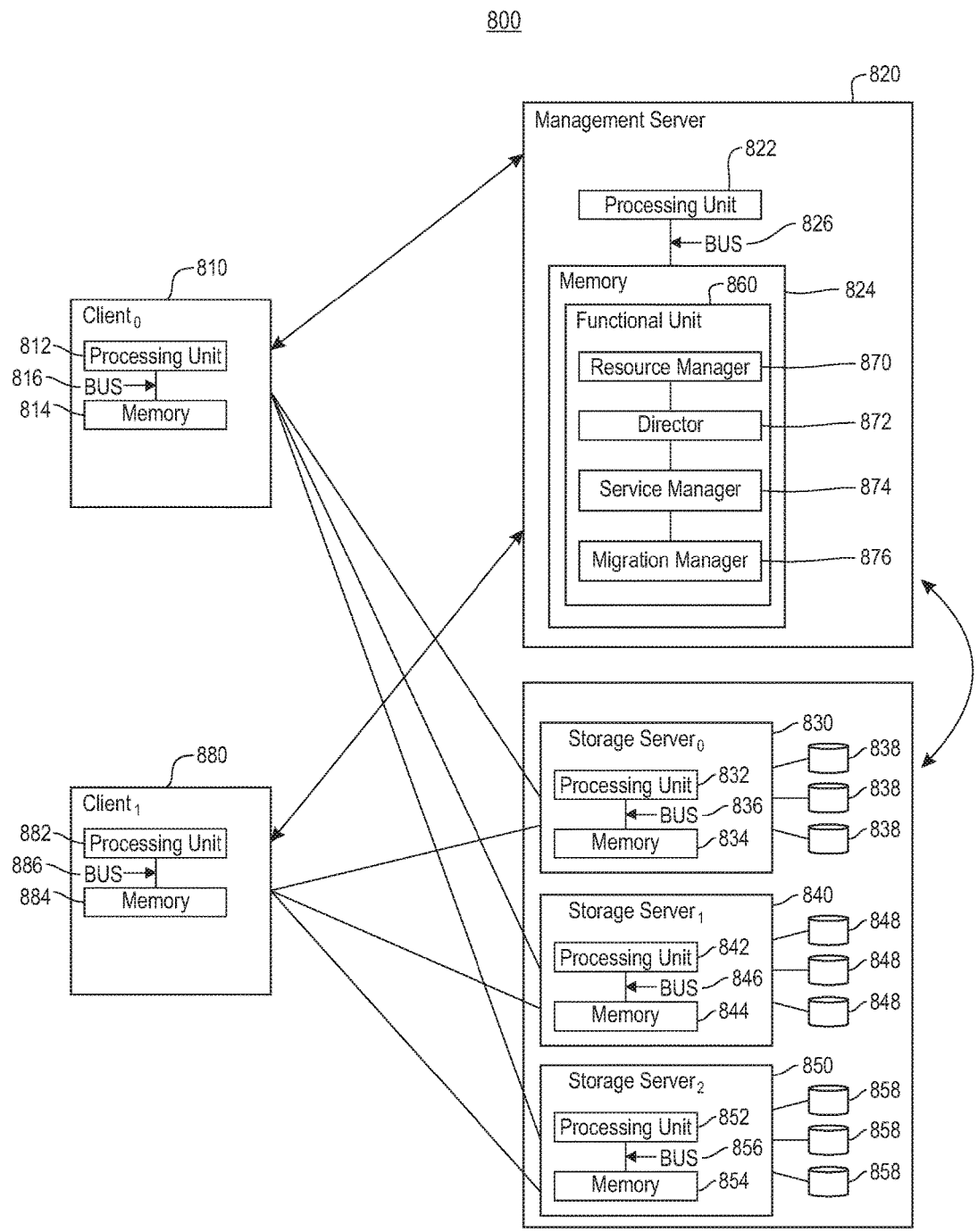
FIG. 8 depicts a block diagram illustrating a client machine in communication with a management server, which communicates with one or more storage servers.

As described above, an evaluation is conducted to intelligently allocate system resources for different workloads. More specifically, the number of data servers is determined based upon workload characteristics and requirements, as well as capacity and availability. FIG. 8 is a block diagram (800) illustrating a client machine in communication with a management server node, which communicates with one or more storage servers. Each of the storage servers is in communication with one or more storage devices. In the example shown herein, one client machine (810) is shown in communication with a management server (820), and at the same time in communication with multiple storage servers (830), (840), and (850). In one embodiment, a storage server is a server that has access to storage. Although two client machines (810) and (880) are shown, in one embodiment one client machine or three or more client machines may be in communication with the management server (820). However, the quantity of client machines, management servers, and storage servers shown here should not be considered a limiting quantity. Similarly, although three storage servers (830)-(850) are shown herein, the embodiment(s) not be limited to this quantity of illustrated storage servers. In one embodiment, the quantity of storage servers may be less than or greater than the quantity shown herein.

The client machine (810) is provided with a processing unit (812), in communication with memory (814) across a bus (816), and in communication with management server (820). Similarly, the management server (820) is provided with a processing unit (822) in communication with memory (824) across a bus (826). Each of the storage servers (830), (840), (850) are provided with hardware to support their respective functionality. More specifically, storage server (830) is provided with a processing unit (832) in communication with memory (834) across a bus (836), storage server (840) is provided with a processing unit (842) in communication with memory (844) across a bus (846), and storage server (850) is provided with a processing unit (852) in communication with memory (854) across a bus (856). In addition, each of the storage servers is in communication with one or more storage devices. More specifically, storage server (830) is in communication with storage devices (838), storage server (840) is in communication with storage devices (848), and storage server (850) is in communication with storage devices (858).

As shown herein, the client machine (810) separately communicates with the management server (820) and with two or more of the storage servers (830), (840), and (850), each of the separate communications being a direct communication. At the same time, the management server (820) communicates with the storage servers (830), (840), and (850). The communication between the client machines (820) and the management server (820) includes metadata communication, and the communication between the management server (820) and the storage servers (830), (840), and (850) includes management protocols, which in one embodiment binds the management server (820) with the storage devices. The communication between the client machine (810) and at least two of the storage servers supports a direct parallel access request. The direct access reduces latency, allows full use of available network bandwidth, and reduces management overhead and storage space required to maintain copies of large data sets in multiple locations.

A functional unit (860) is provided in communication with memory (824) of the management server (820). The functional unit (860) includes tools embedded within the management server (820) to support distribution of hybrid workloads across the storage servers (830), (840), and (850) and their respective storage devices (838), (848), and (858) in an equitable manner. Parallel file system architecture generates a parallel workload, and a client-server architecture generates a serial workload. The parallel file system architecture uses layouts to communicate with the set of storage servers (and byte ranges for each) that clients will use for performing I/O to a file or a data object. It is interesting to note that a layout that contains a single server is similar if not equivalent to the serial workload generated by a client-server architecture Workload requirements include, but are not limited to, speed in the form of I/O per second and bandwidth. The tools include, but are not limited to, a resource manager (870), a director (872), a service manager (874), and a migration manager (876). The resource manager (870) functions in response to receipt of a workload by the management server (820) from the client machine (810). More specifically, the resource manager (870) tracks resource utilization across storage servers (830), (840), and (850) to support both serial and parallel workloads. In one embodiment, the resource manager (870) validates resource availability in a continuous manner and allocates and re-allocates resources based on the validation. Resources include, but are not limited to, available network bandwidth, available storage bandwidth, quantity of current connection, and processing unit resources. In one embodiment, the resources may be expanded to include additional elements. Accordingly, the resource manager (870) operates to periodically determine resource availability and to ensure allocation based in part upon any changes to the resource availability.

As shown, the director (872) is in communication with the resource manager (870). The director (872) functions in response to receipt of a workload requiring optimization and also based upon the workload and tracked resource utilization by the resource manager (870). More specifically, the director (872) calculates a layout of storage servers a parallel access protocol should employ to service an I/O request. The layout includes, but is not limited to, data ranges to the servers. In one embodiment, the director (872) takes data from the resource manager (870) together with workload requirements, and generates a data layout to service the I/O request from the client (810). Accordingly, the resource manager (870) functions together with the director (872) to address input from the client (810) to service the I/O request.

Once the director (872) generates the layout, the I/O request can be serviced. More specifically, the service manager (874) is provided in communication with the director (872) to employ the layout and to communicate the layout to the client machine (820) to support the direct parallel access request from the client machine (820) to at least one of the storage servers (830)-(870) to service the I/O request. More specifically, the service manager (874) balances an I/O load associated with the request across the storage servers (830)-(840). The I/O load includes both a serial and a parallel workload optimization. In addition, the migration manager (876) is provided in communication with the service manager (874). The migration manager (876) functions to migrate serial protocols across the storage servers (830)-(850) in response to the layout as generated by the director (872). More specifically, the migration manager (876) ensures a proper load balancing across the storage servers (830)-(850) and their respective storage devices (838), (848), and (858).

The example described above in FIG. 8 illustrates one client machine in communication with a management server (820), which is in communication with two or more server nodes (830)-(850). In one embodiment, a second client machine (880) is provided in communication with the management and storage servers (820) and (830)-(850), respectively. The second client machine (880) includes a processing unit (882) in communication with memory (884) across a bus (886). In the event of parallel access by the first and second client machines (820) and (880), the director (872) dynamically returns the generated layout to the parallel access clients (820) and (880). Accordingly, the elements of the functional unit (860) may support one or more client machines with both serial and/or parallel access workloads.

As identified above, the resource manager (870), director (872), service manager (874) and migration manager (876) are shown residing in memory (824) of the management server (820). Although in one embodiment, the resource manager (870), director (872), service manager (874) and migration manager (876) may reside as hardware tools external to memory (824) of server (820), or they may be implemented as a combination of hardware and software. Similarly, in one embodiment, the resource manager (870), director (872), service manager (874) and migration manager (876) may be combined into a single functional item that incorporates the functionality of the separate items. As shown herein, each of the resource manager (870), director (872), service manager (874) and migration manager (876) are shown local to one management server (820). However, in one embodiment they may be collectively or individually distributed across the shared pool of configurable computer resources and function as a unit to manage equitable distribution of a hybrid workload. Accordingly, the managers and director may be implemented as software tools, hardware tools, or a combination of software and hardware tools.

As will be appreciated by one skilled in the art, aspects of the present embodiment(s) may be embodied as a system, method or computer program product. Accordingly, aspects of the present embodiment(s) may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiment(s) may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present embodiment(s) may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiment(s) are described above with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
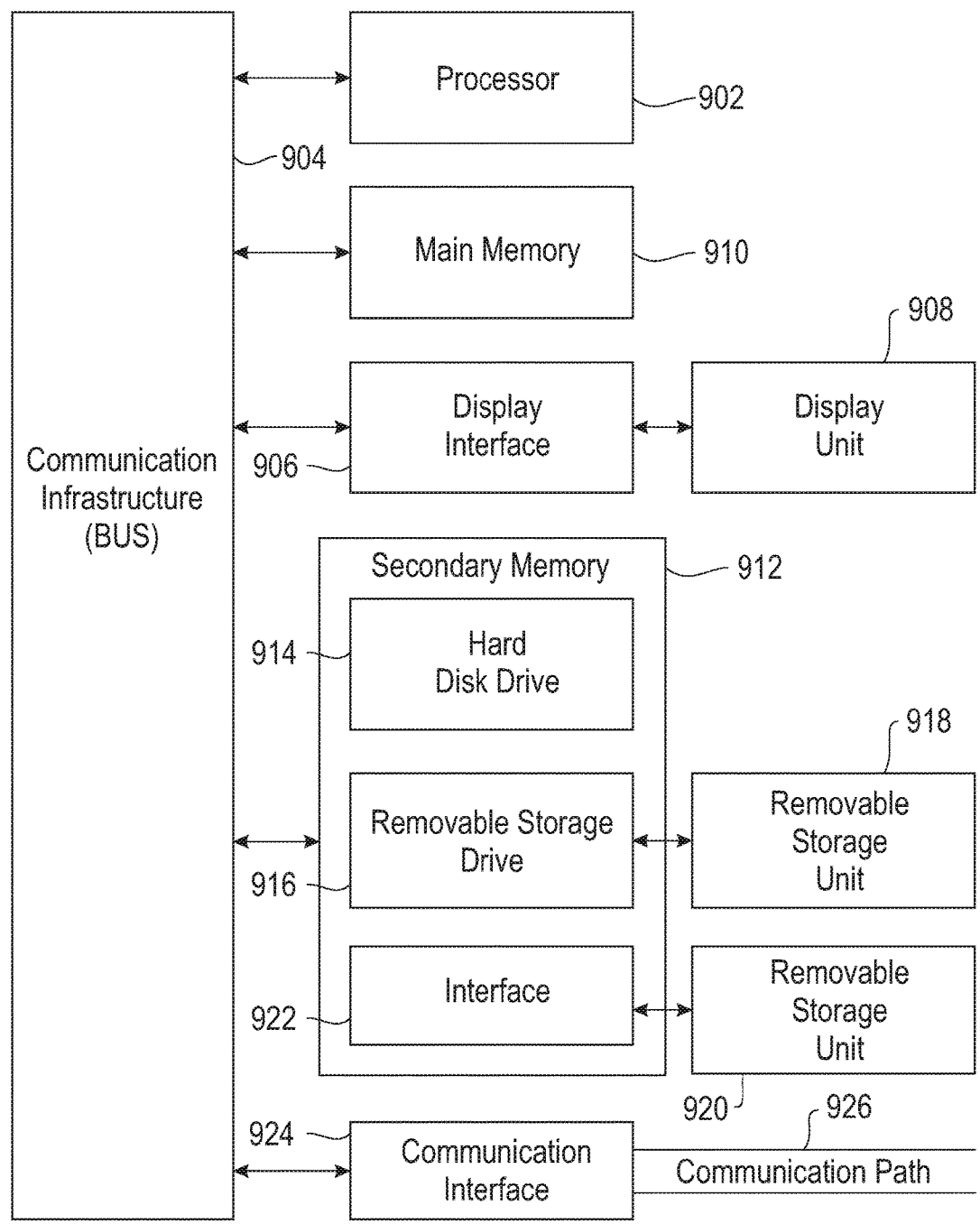
FIG. 9 depicts a block diagram showing a system for implementing an embodiment.

Referring now to FIG. 9 is a block diagram (900) showing a system for implementing an embodiment. The computer system includes one or more processors, such as a processor (902). The processor (902) is connected to a communication infrastructure (904) (e.g., a communications bus, cross-over bar, or network). The computer system can include a display interface (906) that forwards graphics, text, and other data from the communication infrastructure (904) (or from a frame buffer not shown) for display on a display unit (908). The computer system also includes a main memory (910), preferably random access memory (RAM), and may also include a secondary memory (912). The secondary memory (912) may include, for example, a hard disk drive (914) and/or a removable storage drive (916), representing, for example, a floppy disk drive, a magnetic tape drive, or an optical disk drive. The removable storage drive (916) reads from and/or writes to a removable storage unit (918) in a manner well known to those having ordinary skill in the art. Removable storage unit (918) represents, for example, a floppy disk, a compact disc, a magnetic tape, or an optical disk, etc., which is read by and written to by removable storage drive (916). As will be appreciated, the removable storage unit (918) includes a computer readable medium having stored therein computer software and/or data.

In alternative embodiments, the secondary memory (912) may include other similar means for allowing computer programs or other instructions to be loaded into the computer system. Such means may include, for example, a removable storage unit (920) and an interface (922). Examples of such means may include a program package and package interface (such as that found in video game devices), a removable memory chip (such as an EPROM, or PROM) and associated socket, and other removable storage units (920) and interfaces (922) which allow software and data to be transferred from the removable storage unit (920) to the computer system.

The computer system may also include a communications interface (924). Communications interface (924) allows software and data to be transferred between the computer system and external devices. Examples of communications interface (924) may include a modem, a network interface (such as an Ethernet card), a communications port, or a PCMCIA slot and card, etc. Software and data transferred via communications interface (924) are in the form of signals which may be, for example, electronic, electromagnetic, optical, or other signals capable of being received by communications interface (924). These signals are provided to communications interface (924) via a communications path (i.e., channel) (926). This communications path (926) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (910) and secondary memory (912), removable storage drive (916), and a hard disk installed in hard disk drive (914).

Computer programs (also called computer control logic) are stored in main memory (910) and/or secondary memory (912). Computer programs may also be received via a communication interface (924). Such computer programs, when run, enable the computer system to perform the features of the present embodiment(s) as discussed herein. In particular, the computer programs, when run, enable the processor (902) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiment(s) has been presented for purposes of illustration and description, but is not intended to be exhaustive or limited to the form disclosed. Many modifications and variations will be apparent to those of ordinary skill in the art without departing from the scope and spirit of the embodiment(s). The embodiment(s) was chosen and described in order to best explain the principles of the embodiment(s) and the practical application, and to enable others of ordinary skill in the art to understand the embodiment(s) with various modifications as are suited to the particular use contemplated. Accordingly, the enhanced hybrid workload assessment supports flexibility with respect to balancing a workload across the storage servers, with the I/O load request including both a serial workload optimization and a parallel workload optimization.

It will be appreciated that, although specific embodiments have been described herein for purposes of illustration, various modifications may be made without departing from the spirit and scope of the embodiment(s). Accordingly, the scope of protection of the embodiment(s) is limited only by the following claims and their equivalents.

What is claimed is:

1. A system comprising:
   a first server having a processing unit in communication with memory;
   the first server having a tool to manage a heterogeneous I/O workload across one or more storage servers, wherein the heterogeneous I/O workload comprises a parallel I/O workload and a serial I/O workload, the tool comprising:
      track resource utilization across the one or more storage servers;
      balance a received I/O request across the one or more storage servers including:
         determine a layout of the one or more servers to service the received I/O request based on the tracked resource utilization, including determine a quantity of serial I/O workloads to be processed by each of the one or more servers and determine a set of the one or more storage servers to support at least one direct parallel I/O workload; and
         issue a migration request responsive to the determined layout, wherein the migration request includes at least one serial I/O workload currently supported by one of the one or more storage servers and at least one different server to support the at least one serial I/O workload; and
      service the receive I/O request with the determined layout.

2. The system of claim 1, wherein the determination of the layout further comprising the tool to:
   determine one or more heterogeneous I/O workload requirements;
   determine a subset of the one or more storage servers;
   calculate a predicted resource utilization of the one or more storage servers, the prediction based upon the tracked resource utilization, the determined one or more heterogeneous I/O workload requirements, and the subset to service the heterogeneous I/O workload;
   determine the predicted resource utilization is the optimal resource utilization; and
   select the subset as the layout to service the I/O request.

3. The system of claim 2, further comprising the tool to:
   dynamically return the layout to a requesting client associated with the I/O request, the layout including data ranges of the subset; and
   the requesting client to address input according to the layout.

4. The system of claim 3, wherein the determined heterogeneous I/O workload requirements include I/O per second and bandwidth.

5. The system of claim 4, further comprising the tool to continuously validate resource availability and re-allocate at least one resource based on the validation and the determined heterogeneous I/O workload requirements, the re-allocation including a second layout determination and issuance of a second migration request responsive to the second layout.

6. The system of claim 5, wherein the resource is selected from the group consisting of: available network bandwidth, available storage bandwidth, current number of connections, and processing unit resources.

7. The system of claim 1, wherein the service of the received I/O request with the determined layout includes direct access to the layout of the one or more storage servers.

8. A computer program product for management of a heterogeneous I/O workload, the computer program product comprising a computer readable storage medium having program code embodied therewith, the program code executable by a processor to:

track resource utilization across the one or more storage servers;

balance a received I/O request across the one or more storage servers including;

determine a layout of the one or more servers to service the received I/O request based on the tracked resource utilization, including determine a quantity of serial I/O workloads to be processed by each of the one or more servers and determine a set of the one or more storage servers to support at least one direct parallel I/O workload; and issue a migration request responsive to the determined layout, wherein the migration request includes at least one serial I/O workload currently supported by one of the one or more storage servers and at least one different server to support the at least one serial I/O workload to; and service the receive I/O request with the determined layout.

9. The computer program product of claim 8, wherein the determination of the layout further comprising program code to:

determine one or more heterogeneous I/O workload requirements;

determine a subset of the one or more storage servers;

calculate a predicted resource utilization of the one or more storage servers, the prediction based upon the tracked resource utilization, the determined one or more heterogeneous I/O workload requirements, and the subset to service the heterogeneous I/O workload;

determine the predicted resource utilization is the optimal resource utilization; and select the subset as the layout to service the I/O request.

10. The computer program product of claim 9, further comprising program code to:

dynamically return the layout to a requesting client associated with the I/O request, the layout including data ranges of the subset; and the requesting client to address input according to the layout.

11. The computer program product of claim 10, wherein the determined heterogeneous I/O workload requirements include I/O per second and bandwidth.

12. The computer program product of claim 11, further comprising program code to continuously validate resource availability and re-allocate at least one resource based on the validation and the determined heterogeneous I/O workload requirements, the re-allocation including a second layout determination and issuance of a second migration request responsive to the second layout.

13. The computer program product of claim 12, wherein the resource is selected from the group consisting of: available network bandwidth, available storage bandwidth, current number of connections, and processing unit resources.

14. A method for management of a heterogeneous I/O workload comprising:

tracking resource utilization across the one or more storage servers;

balancing a received I/O request across the one or more storage servers including;

determining a layout of the one or more servers to service the received I/O request based on the tracked resource utilization, including determining a quantity of serial I/O workloads to be processed by each of the one or more servers and determining a set of the one or more storage servers to support at least one direct parallel I/O workload; and issuing a migration request responsive to the determined layout, wherein the migration request includes at least one serial I/O workload currently supported by one of the one or more storage servers and at least one different server to support the at least one serial I/O workload to; and servicing the receive I/O request with the determined layout.

15. The method of claim 14, wherein the determination of the layout further comprises:

determining one or more heterogeneous I/O workload requirements;

determining a subset of the one or more storage servers;

calculating a predicted resource utilization of the one or more storage servers, the prediction based upon the tracked resource utilization, the determined one or more heterogeneous I/O workload requirements, and the subset to service the heterogeneous I/O workload;

determining the predicted resource utilization is the optimal resource utilization; and selecting the subset as the layout to service the I/O request.

16. The method of claim 15, further comprising:

dynamically returning the layout to a requesting client associated with the I/O request, the layout including data ranges of the subset; and the requesting client addressing input according to the layout.

17. The method of claim 16, wherein the determined heterogeneous I/O workload requirements include I/O per second and bandwidth.

18. The method of claim 17, further comprising continuously validating resource availability and re-allocating at least one resource based on the validation and the determined heterogeneous I/O workload requirements, the re-allocation including a second layout determination and issuance of a second migration request responsive to the second layout.

19. The method of claim 18, wherein the resource is selected from the group consisting of: available network bandwidth, available storage bandwidth, current number of connections, and processing unit resources.

20. The method of claim 14, wherein servicing of the received I/O request with the determined layout includes direct access to the layout of the one or more storage servers.

* * * * *